June 2, 1953   C. E. BERGAMI   2,640,234
MACHINE FOR MAKING FOUNDRY MOLDS
Filed Dec. 12, 1950   11 Sheets-Sheet 2
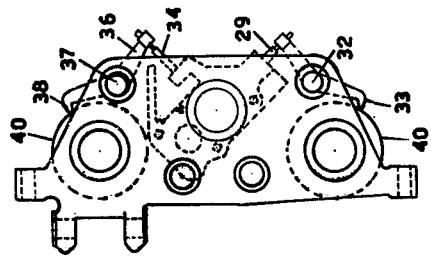
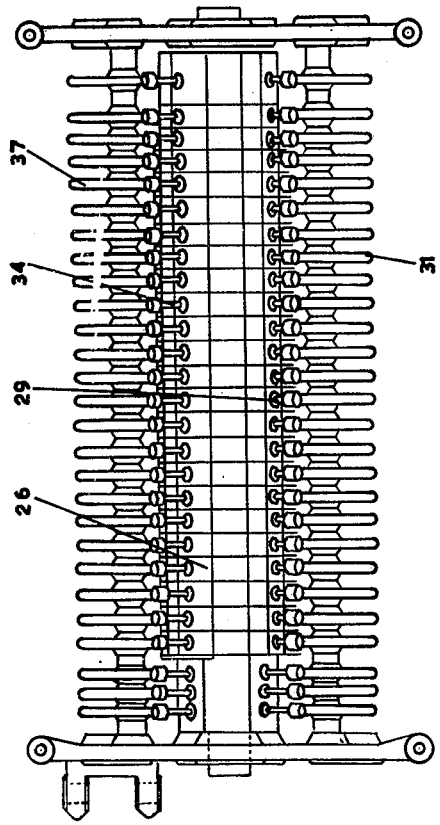
Inventor:
Casto Ennio Bergami
By: [signature]
Attorney

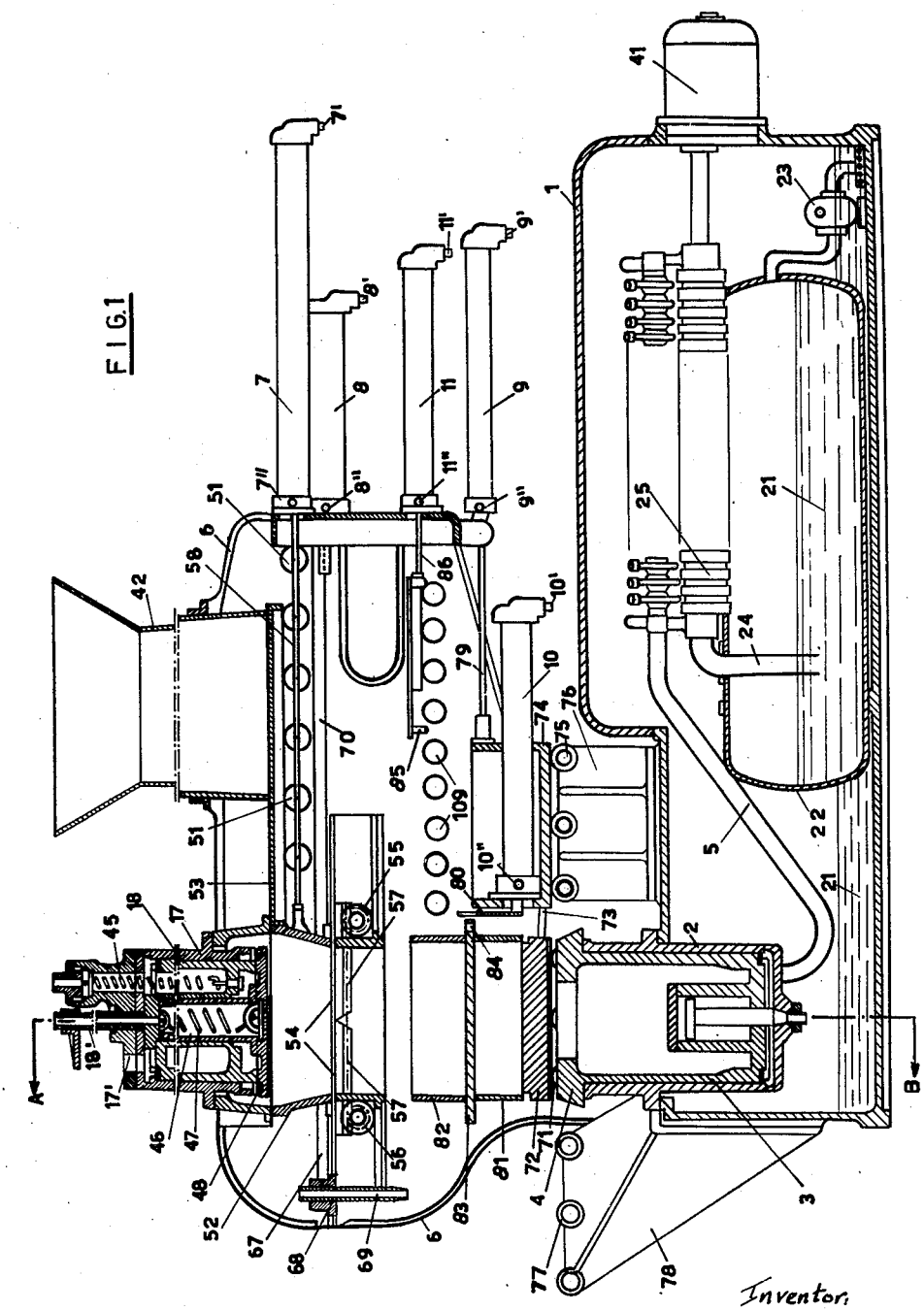

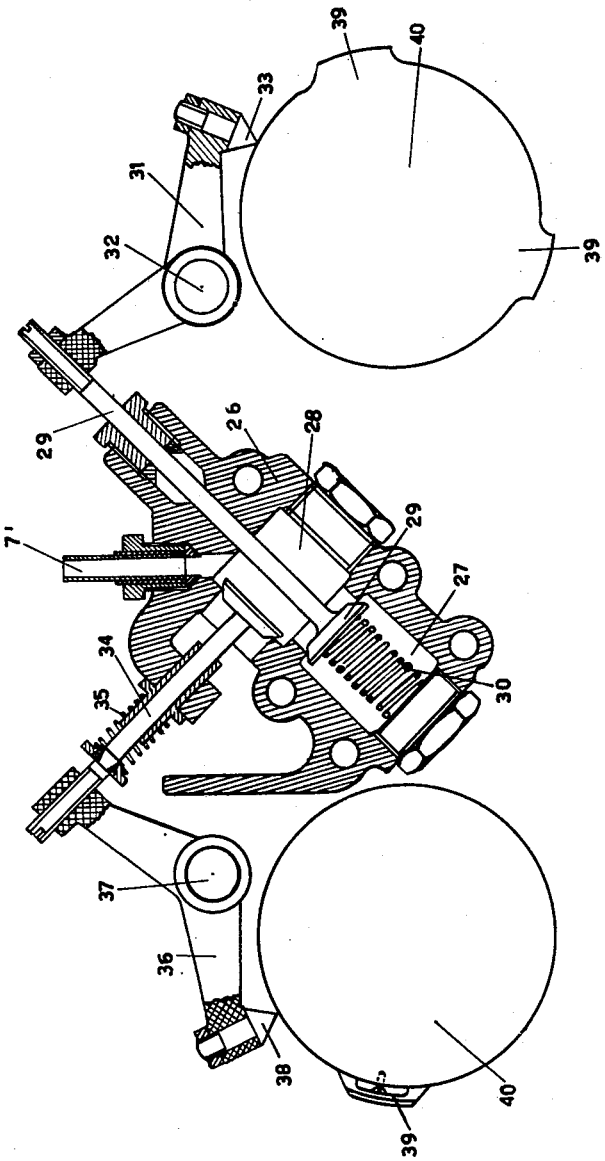

June 2, 1953  C. E. BERGAMI  2,640,234
MACHINE FOR MAKING FOUNDRY MOLDS
Filed Dec. 12, 1950  11 Sheets-Sheet 4

Inventor:
Casto Ennio Bergami
By: B. Schlesinger
Attorney

June 2, 1953 C. E. BERGAMI 2,640,234
MACHINE FOR MAKING FOUNDRY MOLDS
Filed Dec. 12, 1950 11 Sheets-Sheet 5

Inventor:
Casto Ennio Bergami
By: Schlesinger
Attorney

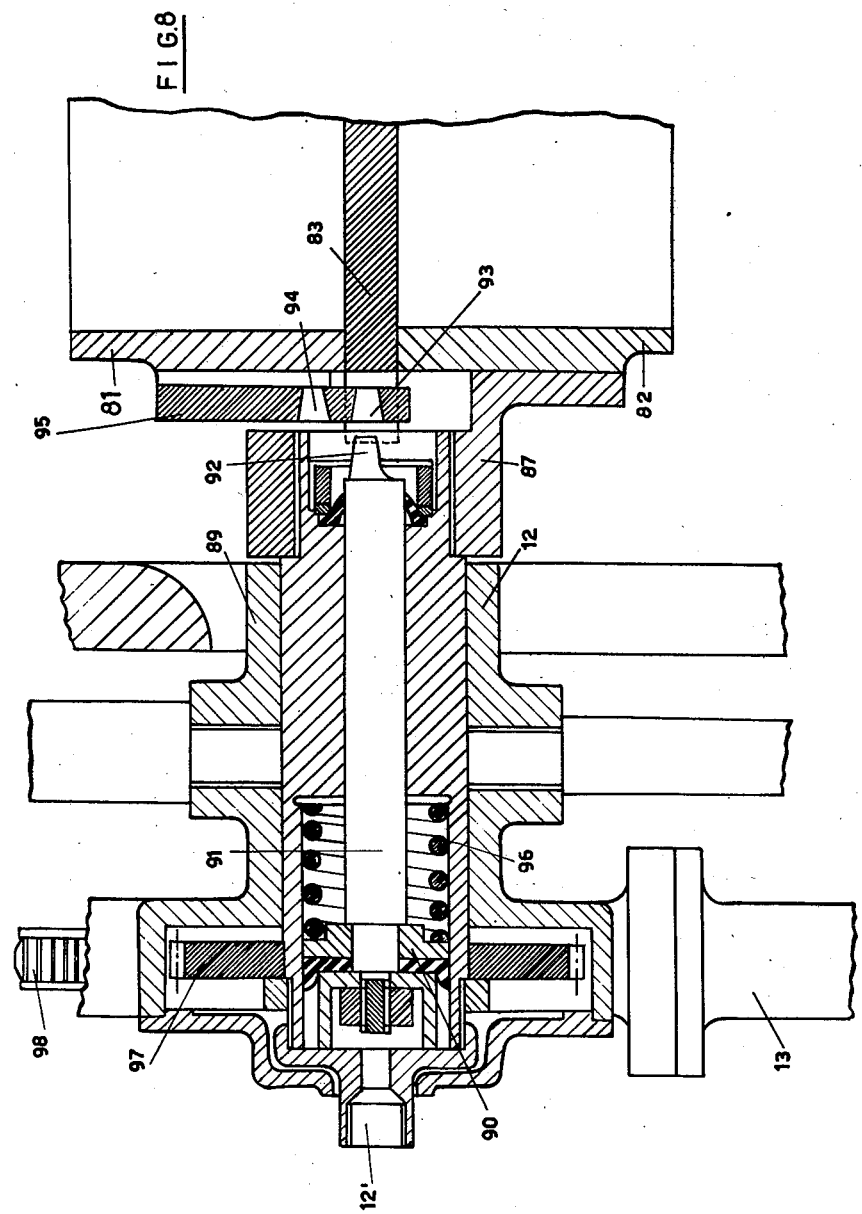

June 2, 1953   C. E. BERGAMI   2,640,234
MACHINE FOR MAKING FOUNDRY MOLDS
Filed Dec. 12, 1950   11 Sheets-Sheet 7
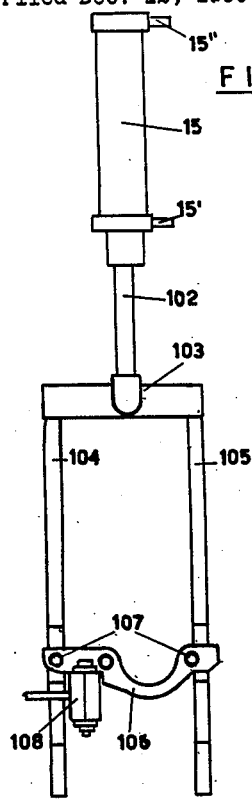
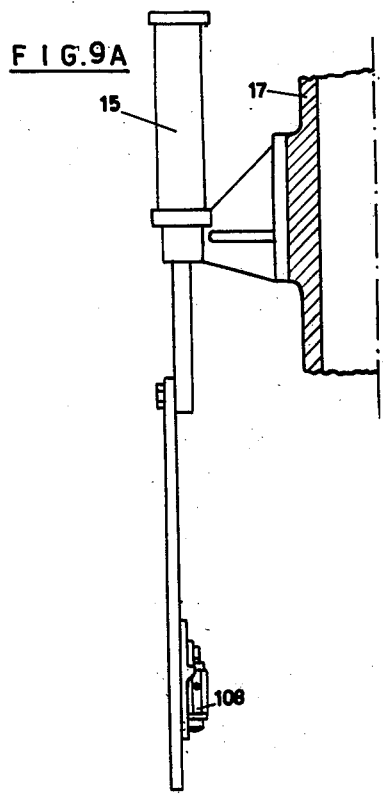
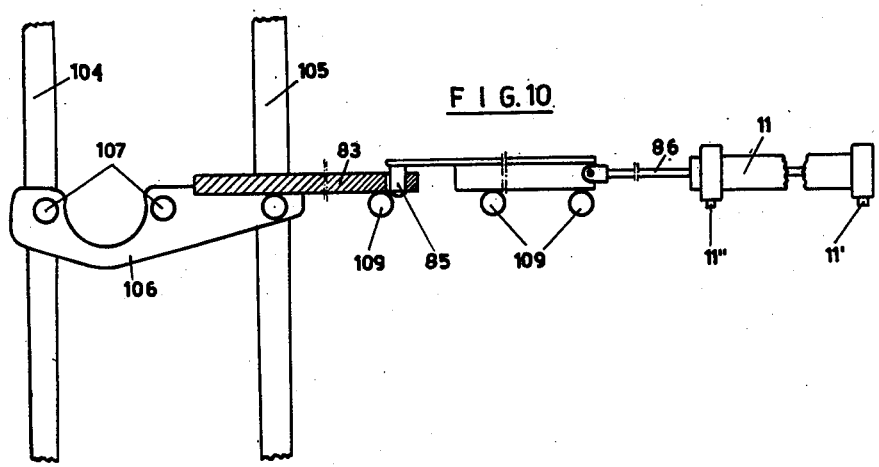
Inventor:
Casto Ennio Bergami
By: B. Schlesinger June 2, 1953  C. E. BERGAMI  2,640,234
MACHINE FOR MAKING FOUNDRY MOLDS
Filed Dec. 12, 1950  11 Sheets-Sheet 8

Inventor:
Casto Ennio Bergami
By B. F. Schlesinger
Attorney

June 2, 1953 C. E. BERGAMI 2,640,234
MACHINE FOR MAKING FOUNDRY MOLDS
Filed Dec. 12, 1950 11 Sheets-Sheet 9
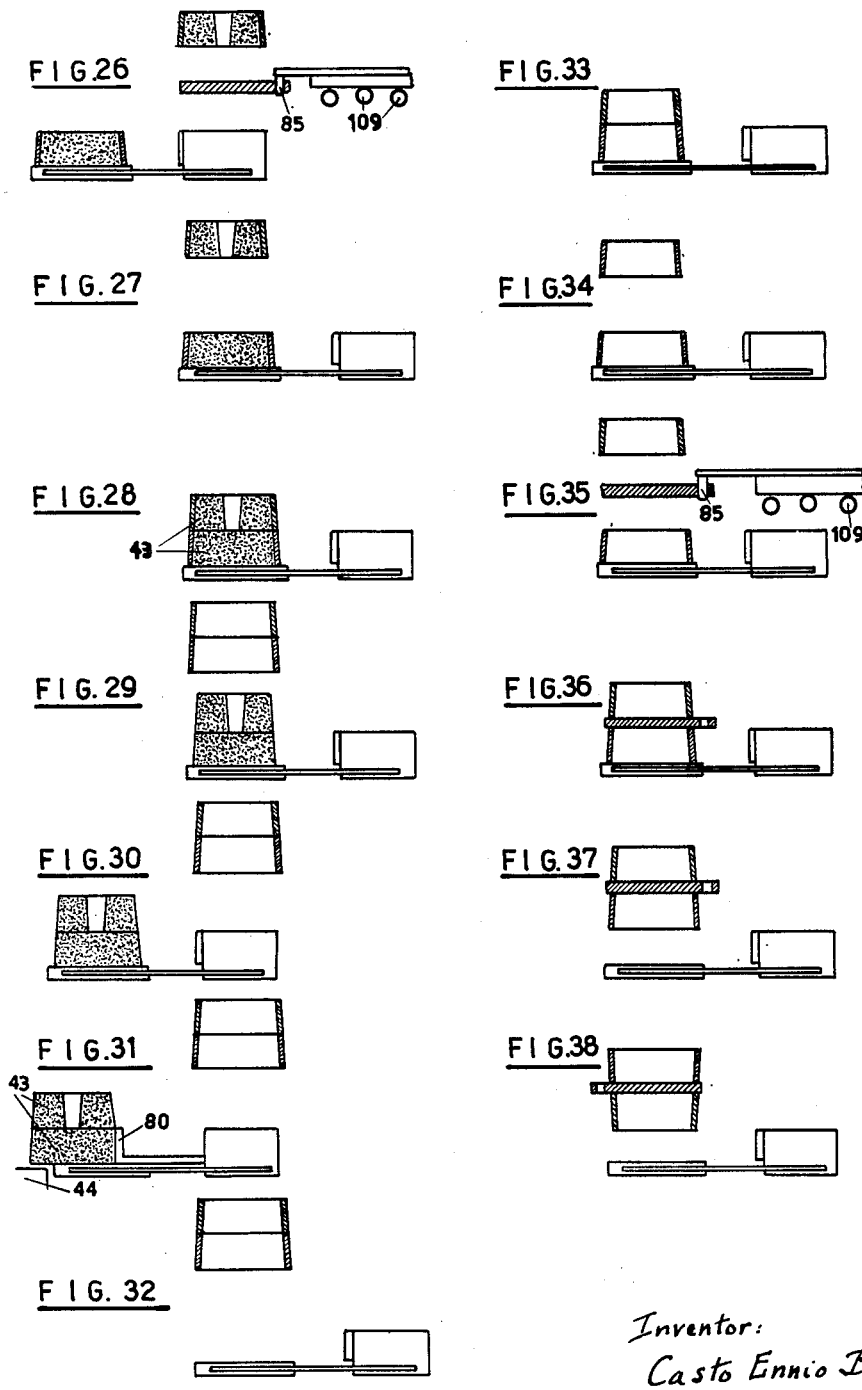

June 2, 1953 — C. E. BERGAMI — 2,640,234
MACHINE FOR MAKING FOUNDRY MOLDS
Filed Dec. 12, 1950 — 11 Sheets-Sheet 10
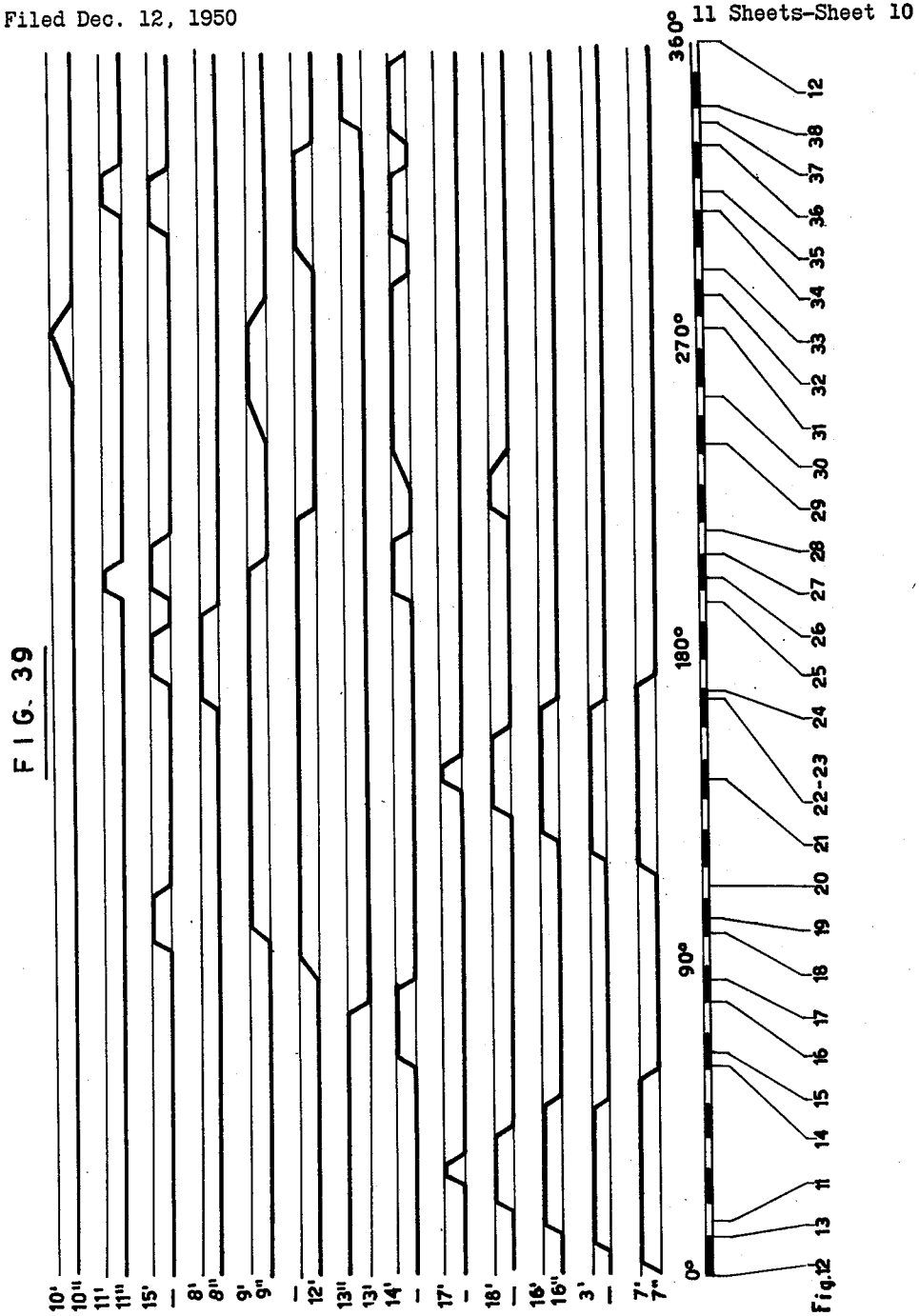
Inventor:
Casto Ennio Bergami
By: B. F. Schlesinger
Attorney

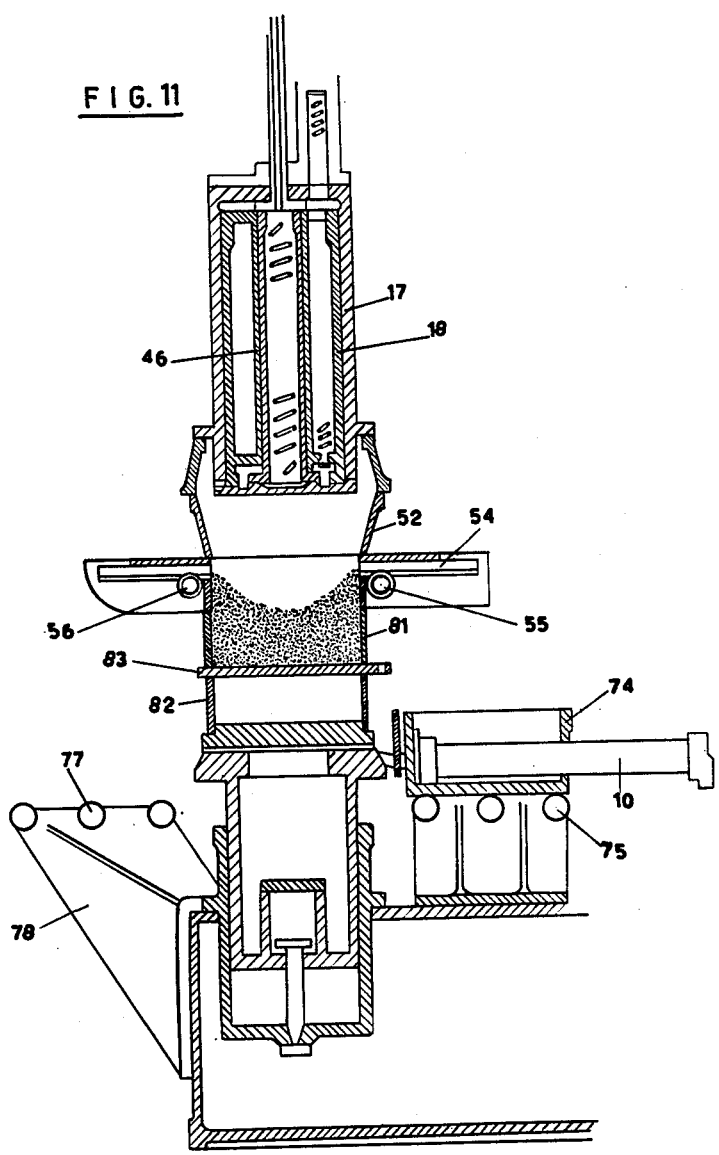

Patented June 2, 1953

2,640,234

UNITED STATES PATENT OFFICE 2,640,234

MACHINE FOR MAKING FOUNDRY MOLDS

Casto Ennio Bergami, Milan, Italy

Application December 12, 1950, Serial No. 200,385
In Italy December 13, 1949

8 Claims. (Cl. 22—25)

This invention relates to the manufacture of foundry molds and its object is to provide a machine which is capable of producing such molds automatically from the sand contained in a hopper without necessity of the operator handling the flask or the sand or intervening for controlling the operation of the machine.

A further object of the invention is to provide a machine for making foundry molds, wherein all the movements of the flask, of the pattern plate and of sand are effected automatically by means of synchronized hydraulic controls. Another object of the invention is to provide such a machine which leaves the first half mold produced inoperative for a period of time on a support, during which period the second half mold is produced while the operator has time sufficient for locating the cores in the first half mold.

A further object of the invention is to provide a machine for making foundry molds in which any undesirable dispersion of sand is prevented with consequent notable saving in the cost of finished molds.

One example of embodiment of the improved machine is illustrated in the accompanying drawings, wherein:

Fig. 1 is a longitudinal section of the machine;

Fig. 2 is an enlarged view of the group of control valves;

Fig. 3 is an end view of said group;

Fig. 4 is a section on a still larger scale of a valve of the aforementioned group;

Fig. 8 is a section on an enlarged scale of the means for supporting the flask;

Figures 9 and 9A represent two views of the device for lifting the pattern plate;

Figure 10 represents in longitudinal section the device for displacing the pattern plate horizontally;

Fig. 11 is a fragmentary longitudinal section showing the machine in the position assumed after filling the first half flask;

Figures 12 to 38 are diagrammatical representations of the relative positions of the two half flasks and of the pattern plate in the different successive steps of operation of the machine.

Fig. 39 is a diagram of the displacement of the control pistons during an entire cycle of operation.

Figure 5:
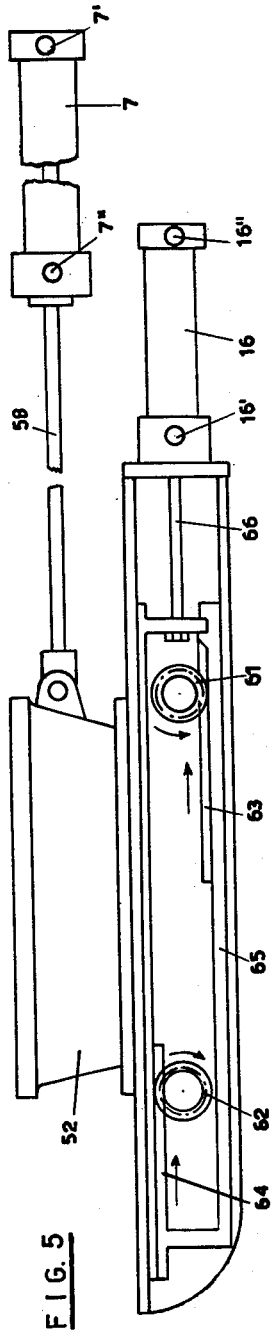
Fig. 5 shows details of the sand measuring casing.

According to the drawings hereinbefore referred to, the machine is composed of a base 1 carrying a cylinder 2 wherein is vertically slidable a piston 3 carrying a platform 4; said piston is actuated by a liquid under pressure coming from the piping 5. The base 1 has a frame 6 extending upwardly from it which carries several hydraulic cylinders, besides the members that will be described hereinafter.

The base 1 is hollow in the shape of a bin containing a liquid 21, for example oil, and encloses a tank 22, which is fluid-tight and into which a pump 23 introduces the oil 21, taking it up at the bottom of the base 1; inside the tank 22 there is maintained a pressure higher than atmospheric, for example six atmospheres.

Into the oil 21 contained in the tank 22 there is immersed a pipe 24 which communicates with a group of valves, indicated at 25 in Fig. 1. Said valves have the structure appearing in Figures 2, 3 and 4.

Each of these valves is constituted by a body 26 containing two cavities 27 and 28. The first of said cavities is in communication with the said pipe 24 feeding oil under pressure; and between the cavities 27 and 28 there is a port of communication closed by a valve 29 actuated for opening, against the reaction of a spring 30, by a rocker 31 pivoted at 32 and terminated by a point 33.

The cavity 28 is also in communication with outside by way of a hole closed by a valve 34, which too is actuated to open against the reaction of a spring 35 by the action of a rocker 36 pivoted at 37 and terminated by a point 38. From the chamber 28 departs a pipe that in Fig. 4 is marked with reference numeral 7'.

Control of the rockers 31 and 36 actuating said valves is effected respectively by noses or projections 39 fastened in a disengageable manner at any desired position around the periphery of the cylinders 40 which are made to rotate in a continuous manner by any suitable motive means indicated in Fig. 1 by reference numeral 41.

The frame 6 (Fig. 1) carries a hopper 42 and a cylinder 17 having vertical axis, wherein is slidable a piston 18 constantly urged upwardly by springs 45 which are fastened at their upper ends to the cylinder 17. The piston 18 is hollow axially and in said axial cavity is slidable a piston 46, which is smaller and which is held upwardly by a spring 47 placed inside it and hooked at its top inside the piston 18. The piston 46 carries a plate 48 at its lower end, the function of which will be explained later on. If the piston 46 is completely retracted upward, this plate bears also against the piston 18, however without being fixed thereto. The piston 18 terminates in a tubular shaft 18', which projects from the bottom of cylinder 17 and can slide therethrough for a length equal to the stroke of the piston 18 in the cylinder 17. Said tubular shaft 18' serves to supply the inner cavity of the piston 18 with fluid under pressure adapted to act upon the piston 46. The bottom of the cylinder 17 is further provided with an aperture 17' for the introduction of fluid under pressure destined to act upon the piston 18.

Under the cylinder 17 and the hopper 42 a casing 52 open at top and bottom is mounted slidably on rolls 51. To one of the flanks of the casing 52, at the same level as its upper border, is connected a horizontal plate 53, which too is supported slidably by the rolls 51. The dimensions of plate 53 are such that if the casing 52 is under the cylinder 17 said plate closes the lower extremity of the hopper 42 adapted to contain the sand, in such a manner as to prevent the sad from discharging.

The horizontal movement of the casing 52 is controlled by the rod 58 fixed to a piston sliding inside the cylinder 7. Into the casing 52 enter two horizontal gates 54, which can be introduced into or extracted from the inside of the casing 52 by two pinions 55 and 56 rotating in contrary sense and engaging with racks 57 rigid with the gates 54.

Figure 6:
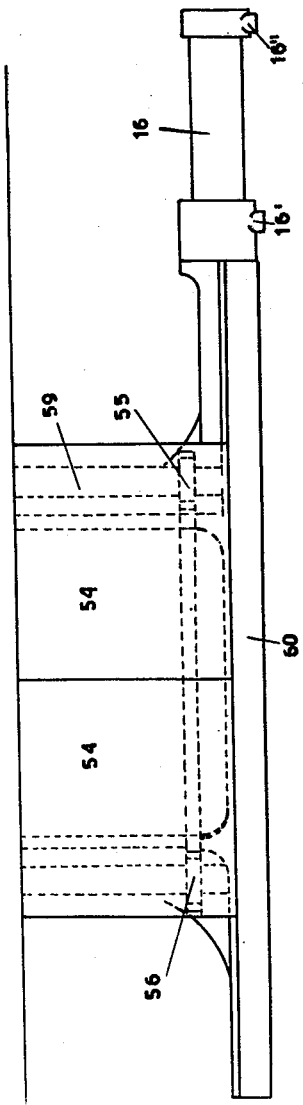
Fig. 6 shows in plan the device for closing said distributing casing.

The details of the gates 54 and of the means for actuating them is more clearly shown in Figures 5 and 6. The pinions 56 are mounted on spindles 59 (Fig. 6) projecting at one end from the casing 52 into a box 60 where they carry respectively two pinions 61 and 62 (Fig. 5). These pinions engage with two racks 63 and 64 that are part of a sliding member 65 displaceable horizontally by the rod 66 of a mobile piston in the cylinder 16 which is integral with the casing 52. As is easily understood from the drawing, the movement of the rod 66 in one direction or the other causes a rotation in contrary direction of the pinions 61 and 62 and consequently also of the pinions 55 and 56, which move the gates 54 symmetrically with respect to a vertical middle plane of the casing 52 in such a manner as to close or open its cavity.

The cavity of the casing 52 has dimensions slightly larger than those of the plate 48, which can penetrate thereinto if it descends.

Under the cylinder 17, at the two sides of the box 52, two parallel guides 67 support slidably the traverse 68, which carries at its centre a tubular hollow punch 69. The traverse 68 is connected to a rod 70 connected in turn with the piston acting in the cylinder 8 with a stroke sufficient to bring the hollow punch 69 under the cylinder 17.

The platform 4 is provided with rolls 71 slidably supporting a carriage 72. This carriage is connected by means of two articulated arms 73 to an auxiliary member 74 supported by rolls 75 carried by a support 76. Said rolls lie in the same plane as rolls 71. At the opposed side, still in the same plane as rolls 71, there are rolls 77 (Fig. 11) supported by a bracket 78 fastened to the base 1.

The auxiliary member 74 is connected to the stem 79 of a piston slidable in the cylinder 9 carried by the frame 6. The piece 74 in turn carries a cylinder 10. To the piston slidable in cylinder 10 is fastened a spatula 80 which, if pushed outward by said piston, slides over the upper face of carriage 72.

Above the carriage 72 there is a flask composed of an element 81 and an element 82 enclosing a pattern plate 83. The patterns carried by the plate 83 are not represented for the sake of simplicity in the drawing. The dimensions and the position of the flask are such that if it is lifted by the action of piston 3, its sides fit the lower aperture of the casing 52. The plate 83 is provided with a hole 84. On lifting of the plate 83, said hole embraces a plug 85 (Figs. 1 and 10) if the latter is pushed horizontally into registry with said hole 84 by the action of a piston acting in the cylinder 11 and carrying said plug by means of the stem 86.

Figure 7:
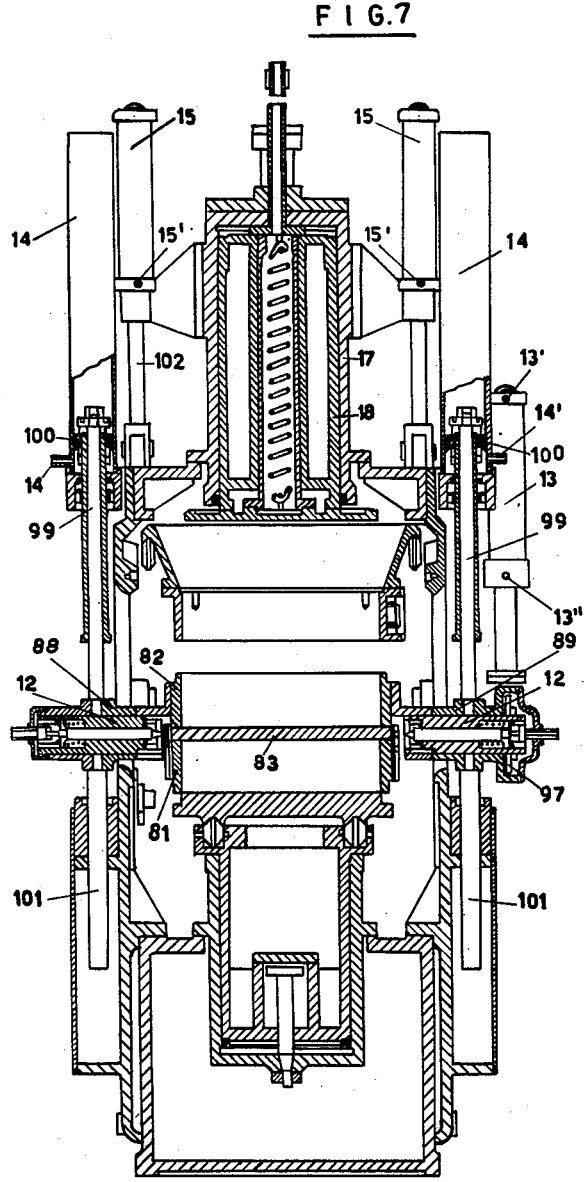
Fig. 7 is a vertical cross section of the machine.

The elements composing the flask are tied to the machine in the manner illustrated in Figures 7 and 8. The element 82 is made rigid with two cylinders 12 by means of two members 87. Said cylinders 12 are rotatably supported in two bushings 88 and 89. The two cylinders 12 contain pistons 90 the stems 91 of which terminate in locking ends 92 adapted to penetrate into holes 93 and 94 of a plate 95 fixed to the other element 81 of the flask. A spring 96 pushes the piston 90 in the direction to disengage the locking end 92 from the said holes. The center distance of the holes 93 and 94 is equal to the thickness of the pattern plate 83.

To one of the cylinders 12 is fixed a gear 97 meshing with a rack 98 controlled by a piston acting in a cylinder 13, which cylinder is fixed onto the bushing 89.

The bushings 88 and 89 are fixed to vertical rods 99 freely slidable in the pistons 100 which operate in the cylinders 14 fixed to the frame 6. The rods 101 on the extension of the rods 99, serve as guides.

There are provided two cylinders 15 rigid with the frame 6 and fixed in practice to the cylinder 17. In each of said cylinders 15 acts as a piston, to whose stem 102, as can be seen in Figure 9, is fixed a yoke 103 carrying two vertical rods 104, 105 supporting in turn a yoke 106 carrying overhanging rolls 107, which are in the same vertical plane as that part of the plate 83 that projects from the two elements 81, 82 of the flask. The yoke 106 is shaped in such a manner as not to interfere with the members 87 if it is lifted. 108 indicates a vibrator of any known type.

When the yoke 106 is in its highest position, corresponding to the upper end of stroke of the piston acting in the cylinder 15, the upper tangent plane of the rolls 107 is at the same level as the upper tangent plane of the rolls 109, which can be seen in Fig. 1 and, more in detail, in Fig. 10.

Operation of the machine is as follows: It is described hereinafter with reference to the drawings and to the diagram of Fig. 39. In this diagram the abscissae represent the angles of rotation of the cams 40 during one revolution of which the machine performs an entire cycle of operation, while the ordinates of each of the broken lines represent the positions of the pistons in each of the cylinders marked with corresponding numerals. The ordinates marked with apices correspond to the extreme positions assumed by each piston if oil is introduced into the respective cylinder through the pipe marked in the other figures with the same numeral and apex. In the lower part of Fig. 39 there are indicated the references to Figures 12 and 38, which represent the positions of the elements of the flask in the various successive steps of the cycle of operations.

Figure 12:
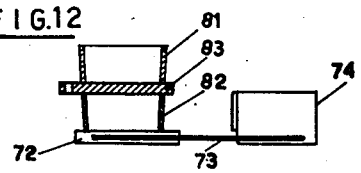

Suppose the machine to be in the position indicated in Figures 1 and 7, but with the casing 52 displaced to the right under the hopper 42 and the flask assembly turned upside down, that is to say with the element 82 downside resting on the carriage 72 and the element 81 topside in the position indicated in the diagram of Fig. 12.

After starting movement of the machine, as the cam 40 turns, the projection 39 goes under the point 38 (Fig. 4) and raises it, thus causing the opening of the valve 29. Oil passes from chamber 27 to chamber 28 and therefrom into the pipe 7', flowing along the continuation of said pipe, not represented in Fig. 1, to the point marked also 7' in said figure, where it enters the cylinder 7. The piston of cylinder 7, pushed by oil pressure, displaces and causes movement toward the left of the casing 52, whose upper portion was previously filled with sand coming from the hopper 42. While the casing 52 shifts leftward, the plate 53 closes the lower mouth of the hopper 42 and thus stops sand feed. This movement ends after about 5 degrees rotation of the cams 40, as it can be seen in the diagram of Fig. 39.

Figure 13:
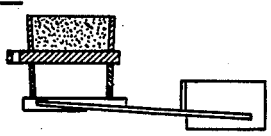

By means of an analogous control of the corresponding valve, then the piston 3 of the cylinder 2 (Fig. 13) rises and brings the flask to contact the lower border of the casing 52 (which happens at a phase of about 10 degrees, Figure 39). Then the piston in cylinder 16 is actuated, which as hereinbefore described moves the gates 54 bringing them to the position indicated in Figure 11, whence the sand contained in the upper portion of the casing 52 descends into the element 81 of the flask, remaining also in part in the lower portion of the casing 52 itself. It should be noted that as a consequence of the movement of the gates 54, the sand first descends into the middle portion of the element 81 accommodating itself therein by gravity and, at last, along its flanks, assuming the position shown in Fig. 11 (phase 15°, Fig. 39).

The intervention of a successive valve of group 25 then introduces fluid under pressure into the tubular shaft 18' of the piston 18, causing the piston 46 to go down. The piston 46 takes along with it the plate 48, which comes to rest on the sand fallen down from the gates 54 and levels it, imparting to it a first compression, phase 22° (Fig. 39). Subsequently another valve of group 25 introduces fluid by way of the hole 17' into the cylinder 17 thus causing descent of the larger piston 18, which until that time had been kept at the top of its stroke by the springs 45. Said piston 18, pushed by a total pressure notably larger than the pressure which has pushed the piston 46 downward, comes to rest on the plate 48 causing by way of the latter a powerful compression of the sand in the element 81 (phase 28°). Owing to the initial disposition of the sand as appears in Fig. 11, said sand is consequently compressed much more powerfully near to the walls of the element 81, where indeed it is desirable to have it tamped as much as possible.

The quantity of sand fed from the casing 52 of course is measured in such a manner that it can be contained, after compression, in the element 81 of the flask.

At this time the pistons acting in the cylinder 43, in the cylinder-piston 18 and in the cylinders 16, 2 and 7, perform in reverse order their respective return movements, as indicated in the diagram of Fig. 39, thus reaching a phase of about 60°, in consequence of which all the members of the machine assume their initial positions with the only difference that the element 81 of the flask is filled with compressed sand. Said return movements of the pistons are performed under the control of the respective valves of group 25. For example the valve hereinbefore described inserted in the pipe 7' (Fig. 4) is actuated by a projection 39, which on meeting the point 38 of the rocker 36, causes the opening of the valve 34, allowing discharge therethrough of the oil which is pushed back by the piston along the pipe 7'. At the same time, another similar valve causes in the manner already described hereinbefore the introduction of oil into the pipe 7'', which causes the rearward movement of the piston in the cylinder 7. Operation of all the other cylinders of this machine is analogous, with the only variant that those which are counteracted by a spring or by gravity are governed by only one valve of the type described, the return of the piston being effected by the spring or by gravity, while oil discharges through the same valve in the manner described hereinbefore.

Figure 14:
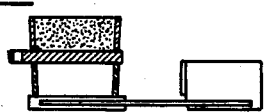
Figure 15:
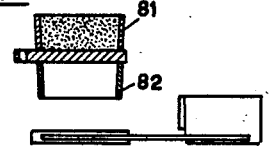

At this time the flask appears as diagrammatically illustrated in Fig. 14. Then oil is introduced in the usual manner into the pipes 14', causing rise of the pistons 100 in the cylinders 14. In that way, the bushings 88 and 89 are lifted. Consequently, the flask element 82 is lifted because this element is connected to the element 81 owing to the fact that the locking members 92 are pushed into the holes 93 by the action of the piston 90, which is under the action of the oil sent into 12' by the associated valve at the start of the cycle (Fig. 15, phase 65°).

Figure 16:
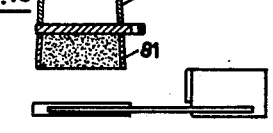
Figure 17:
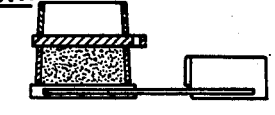

When the flask has been completely lifted in this way, oil is sent through port 13' into the cylinder 13 causing the descent of the associated piston and, therefore, the movement of the rack 93, which causes the rotation of the gear 97 and, therefore, of the whole assembly constituted by the cylinders 12 and by the entire flask supported thereby (Fig. 16, phase 80°). After this operation the movement of oil in the cylinders 14 is reversed, by the associated valves, causing the return down of the entire flask turned upside down onto the carriage 72 (Fig. 17, phase 86°).

Figure 18:
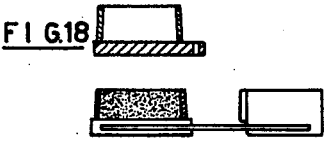

If the oil is discharged now from the cylinders 12 through port 12', the opening of the locking members 92 is obtained, disengaging thus the element 81 from the element 82. Then oil is introduced into port 15' causing the rise of the pistons in the cylinders 15 and the consequent rise of the yokes 106, which by means of rolls 107 grip and lift the plate 83 together with the element 82, leaving the element 81 with the sand on the carriage 72. The detaching of sand from the patterns carried by the plate 83 is facilitated by the action of the vibrator 108 (Fig. 18, phase 100°).

By then sending oil into port 9' in the cylinder 9, the associated piston is shifted to the left.

Figure 19:
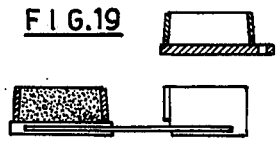
Figure 20:
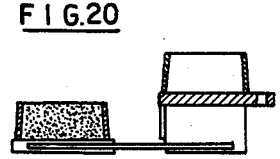

This piston pushes by means of the stem 79 the auxiliary member 74 on the rolls 75 as far as the platform 4 in lieu of the carriage 72, which being pushed in turn by way of the rods 73 is displaced onto the rolls 71 taking along with it the element 81 filled with compressed sand (Fig. 19, phase 104°). In this position, the element 81 remains available for the operator for placing the cores into the molded sand. By discharging oil from port 14' then the pistons 100 are made to descend again in the cylinders 14, whence the yokes 106 with the rolls 107 deposit the plate 83, still carrying the element 82, onto the auxiliary member 74 (Fig. 20, phase 114°).

Figure 21:

At this time, the movements of the machine are repeated as described at the beginning of the cycle of operations. Hence the casing 52, which in the meantime has been filled with sand, is brought again under the cylinder 17, the piston 3 is made to rise again carrying the element 82 into register with the lower edge of the casing 52, and the gates 54 are opened filling the element 82 with sand. Then first the piston 46 descends with the plate 48 and subsequently the piston 18, which presses the sand in the element 82 in the identical manner as hereinbefore described with reference to the element 81 (Fig. 21, phase 145°).

Figure 22:
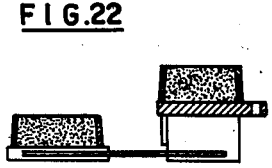

Subsequently the pistons 18 and 46 and the gates 54, the piston 3 and the casing 52 return to their initial positions in the same manner as described in the first part on the cycle (Fig. 22, phase 167°).

Figure 23:
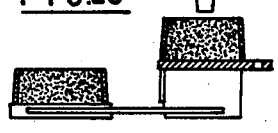

In the meantime, however, while the casing 52 reverses as stated above, oil is sent into port 8'' whence the piston contained in 8 drives outwardly the hollow punch 69 above the element 82 Fig. 23, phase 167°.

Oil is sent again into port 15' causing rise of the rod 102, of the yoke 106 and consequently of the plate 83 carrying the element 82 filled with compressed sand.

Figure 24:
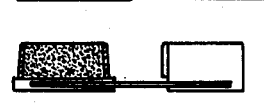

During the last stage of rise of the plate 83 with the element 82 the hollow punch 69 penetrates into the sand making therein the hole that serves for casting (Fig. 24, phase 170°).

Figure 25:

Immediately thereafter, by reversing the oil feed in the cylinders 15 and 8, the plate 83 with the element 82 is returned onto the auxiliary member 74 and the hollow punch is returned to its initial position. (Fig. 25, phase 197°.)

Then, in the usual manner, the pistons contained in the cylinders 15, which rise, and at the same time the pistons 100 contained in the cylinders 14 are again operated. At the same time, by introducing oil into port 11', the displacement of the plug 85 (carried by the stem 86 of the piston working in the cylinder 11) to the left is obtained.

While the plate 83 is brought, by the rise of the traverse 106 with the rolls 107, to the level of the upper plane tangent to the rolls 109, the element 82 is lifted by the bushings 88 and 89, by the action of the pistons 100 acting in the cylinders 14, to a somewhat level, detaching the sand contained in the element 82 from the pattern plate 83, said operation being facilitated by the intervention of the vibrator 108 fixed to the traverse 106. It the position now assumed, the plate 83 is engaged with the plug 85 which has penetrated into the hole 84 during the last section of the lift of the plate 83 (Fig. 26, phase 203°).

The piston acting in the cylinder 11 is immediately made to reverse by reversing the oil feed, whence the plate 83 is dragged away by the plug 85 sliding over the rolls 109. In the meantime, while the element 82 and the plate 83 are held lifted, oil action is reversed in the cylinder 10, bringing the auxiliary member 74 back onto the rolls 75 and the carriage 72, carrying the element 81, onto the rolls 71 of the platform 4 (Fig. 27, phase 210°). At this time, the return descent of the pistons acting in the cylinders 14 and 15 is obtained and, consequently, the return descent of the element 82 onto the element 81 (Fig. 28, phase 217°).

On then introducing oil into port 12', the locking members 42 are closed, which this time penetrate into the holes 94, the plate 83 having been retracted from between the two elements of the flask. In this way connection between the two elements 81, 82 with each other is obtained again. Then oil is introduced into port 18' causing descent of the plate 48 into the sand contained in the flask and, immediately afterwards, oil is introduced into port 14' thus causing the lift of the flask, which leaves on the carriage 72 the sand mold 43 held down by the platform 48 (Fig. 29, phase 243°).

Then oil is discharged from port 18', allowing the platform 48 to rise again by action of the spring 47 and oil is sent into 9', obtaining in the manner already described the forward movement of the auxiliary member 74 into the platform 4 and the consequent displacement of the carriage 72 carrying the finished sand mold on the rolls 77 (Fig. 30, phase 257°).

At this time, oil is introduced into port 10' causing the spatula 80 to come out. The spatula 80 is connected to the piston acting in the cylinder 10 and it pushes the sand mold out of the carriage 72 onto a plate provided for this purpose, which may be part of a conveyor device or any carriage taking the mold to the foundry (Fig. 31, phase 276°). Thereafter the pistons acting in the cylinders 9 and 10 are made to return, whence the spatula 80 is retracted and the carriage 72 returns onto the platform 4 while the auxiliary member 74 returns onto its rolls 75 (Fig. 32, phase 286°). Immediately thereafter oil is sent into ports 9'' and 10'' by discharging from ports 9' and 10', so that return of the auxiliary member 74 is obtained as well as return of the spatula 80 and of the carriage 72. Then oil can be discharged from port 14' causing the pistons 100 in the cylinders 14 to descend and permitting the suporting bushings 88, 89, to deposit again the two flask elements 81, 82, still coupled by the locking members 92, onto the carriage 72 (Fig. 33, phase 293°).

At this time oil is discharged from port 12 to allow opening of the locking members 92 by action of the springs 96 and, immediately thereafter, oil is admitted again to ports 14', to cause rise of the pistons 100 in the cylinders 14 and the consequent lift of the element 82, which being disengaged from the element 81 leaves the latter on carriage 72 (Fig. 34, phase 310°).

By now introducing oil into the cylinder 11', the stem 86 of the associated piston carrying the plug 85 is again moved to the left. Said plug 85 pushes the plate 83 making it slide over the rolls 109 to the position from which it had taken it away, namely onto the rolls 107 of the yoke 106 which in the meantime was lifted by introducing oil into port 15' (Fig. 35, phase 316°).

At this time oil is discharged from port 14' and from port 15' permitting the descent of the plate 83 and of the element 82, while by discharging oil from port 11' and introducing it into port 11'' return is obtained of the piston acting in the cylinder 11 and of the plug 85 to the initial position (Fig. 36, phase 326°).

Now the flask rests again with its associated pattern plate on the carriage 72 but in a reversed position with respect to the initial one. Therefore, oil is again introduced into port 12' and into port 14', closing the locking members 92, this time in the holes 93, and lifting the bushings 88, 89 by action of the pistons 100.

The bushings 88, 89 take along with them the whole flask unit, which is kept assembled by said locking members (Fig. 37, phase 336°). Thereafter, by feeding oil into port 13'', the piston contained in the cylinder 13 and, thereby, the rack 98 are lifted, which rack rotates the gear 97 together with the cylinder 12 and the assembled flask unit (Fig. 38, phase 353°). Finally, the oil is discharged through port 14', thus causing the bushings 88, 89 to descend again so as to lay down the assembled flask onto the carriage 72, the machine with all its parts being then, at a phase of 360°, in the initial condition of the operative cycle, which starts again without interruption.

The duration of the whole cycle may be one minute or even less.

Having now particularly described and ascertained the nature of my said invention, and in what manner the same is to be performed, I declare that what I claim is:

1. A machine for making foundry molds comprising a frame, a flask consisting of two flask elements and a pattern plate, a member slidably carried by said frame for sliding in a vertical direction, a support rotatably carried by said vertically slidable member and fastened to one of said flask elements, locking means carried by said rotatable support for fastening the other of said flask elements to the first mentioned flask element, a member supported for horizontal sliding movement by said frame provided with a piece interlocking with said pattern plate, supporting means for said pattern plate slidably carried by the frame for vertical movement under said plate, a sand container on the frame having a bottom discharge port, closing means for said port whereby the sand falls down when said closing means are displaced for opening said port, hydraulic cylinders on the frame, pistons acting in said cylinders and operatively connected respectively to said vertically slidable member, to said horizontally sliding member, to said vertically slidable supporting means and to said closing means, a hydraulic cylinder on said first mentioned vertically slidable member, a piston acting in the last named cylinder and operatively connected to said rotatable support for rotating said support in said vertically slidable member, a hydraulic cylinder fixed to said rotatable support, a piston acting in the last named cylinder and operatively connected to said locking means, pipes for feeding a liquid under pressure to each of all the above cylinders, valves on said pipes governing the direction of flow of said liquid therethrough and a plurality of cams connected together for simultaneous rotation and operatively connected to said valves for actuating said valves cyclically.

2. A machine for making foundry molds comprising a frame, a flask consisting of two flask elements and a pattern plate, a member slidably carried by said frame for sliding in a vertical direction, a support rotatably carried by said vertically slidable member and fastened to one of said flask elements, locking means carried by said rotatable support for fastening the other of said flask elements to the first mentioned flask element, a member supported for horizontal sliding movement by said frame provided with a piece interlocking with said pattern plate, supporting means for said pattern plate slidably carried by the frame for vertical movement under said plate, a sand container on the frame having a bottom discharge port, a casing open at top and bottom, slidably supported by the frame to slide horizontally under said container, the open top of said casing being immediately under said discharge port, a plate attached to and at the same level as said open top so as to lay immediately under said discharge port when said casing moves away therefrom, gates slidably supported within said casing for closing and opening the passage of sand through said casing, hydraulic cylinders on the frame, pistons acting in said cylinders and operatively connected respectively to said vertically slidable member, to said horizontally sliding member, and to said vertically slidable supporting means, a hydraulic cylinder on said first mentioned vertically slidable member, a piston acting in the last named cylinder and operatively connected to said rotatable support for rotating said support in said vertically slidable member, a hydraulic cylinder fixed to said rotatable support, a piston acting in the last named cylinder and operatively connected to said locking means, a hydraulic cylinder fixed to said casing, a piston acting in the last named cylinder and operatively connected to said gates, pipes for feeding a liquid under pressure to each of all the above cylinders, valves on said pipes governing the direction of flow of said liquid therethrough and a plurality of cams connected together for simultaneous rotation and operatively connected to the several valves for actuating said valves cyclically.

3. A machine for making foundry molds comprising a frame, a flask consisting of two flask elements and a pattern plate, a member slidably carried by said frame for sliding in a vertical direction, a support rotatably carried by said vertically slidable member and fastened to one of said flask elements, locking means carried by said rotatable support for fastening the other of said flask elements to the first mentioned flask element, a member supported for horizontal sliding movement by said frame provided with a piece interlocking with said pattern plate, supporting means for said pattern plate slidably carried by the frame for vertical movement under said plate, a sand container on the frame having a bottom discharge port, a casing open at top and bottom, slidably supported by the frame to slide horizontally under said container, the open top of said casing being immediately under said discharge port, a plate attached to and at the same level as said open top so as to lay immediately under said discharge port when said casing moves away therefrom, gates slidably supported within said casing for closing and opening the passage of sand through said casing, hydraulic cylinders on the frame, pistons acting in said cylinders and operatively connected respectively to said vertically slidable member, to said horizontally sliding member and to said vertically slidable supporting means, a further hydraulic cylinder on the frame above said first mentioned flask element, a piston acting in the last named cylinder and a horizontal plate under the last named piston whereby said plate can be urged downward, the dimensions of said plate being smaller than the dimension of the horizontal section of the cavity of said casing, a hydraulic cylinder on said first mentioned vertically slidable member, a piston acting in the last named cylinder and operatively connected to said rotatable support for rotating said support in said vertically slidable member, a hydraulic cylinder fixed to said rotatable support, a piston acting in the last named cylinder and operatively connected to said locking means, a hydraulic cylinder fixed to said casing, a piston acting in the last named cylinder and operatively connected to said gates, pipes for feeding a liquid under pressure to each of all the above cylinders, valves on said pipes governing the direction of flow of said liquid therethrough and a plurality of cams connected together for simultaneous rotation and operatively connected, respectively, to the several valves for actuating said valves cyclically.

4. A machine for making foundry molds comprising a frame, a flask consisting of two flask elements and a pattern plate, a member slidably carried by said frame for sliding in a vertical direction, a support rotatably carried by said vertically slidable member and fastened to one of said flask elements, locking means carried by said rotatable support for fastening the other of said flask elements to the first mentioned flask element, a member supported for horizontal sliding movement by said frame provided with a piece interlocking with said pattern plate, supporting means for said pattern plate slidably carried by the frame for vertical movement under said plate, a sand container on the frame having a bottom discharge port, a casing open at top and bottom, slidably supported by the frame to slide horizontally under said container, the open top of said casing being immediately under said discharge port, a plate attached to and at the same level as said open top so as to lay immediately under said discharge port when said casing moves away therefrom, gates slidably supported within said casing for closing and opening the passage of sand through said casing, hydraulic cylinders on the frame, pistons acting in said cylinders and operatively connected respectively to said vertically slidable member, to said horizontally sliding member, and to said vertically slidable supporting means, a further vertical hydraulic cylinder on the frame above said first mentioned flask element, a smaller cylinder slidably contained in said last named cylinder, a piston in said smaller cylinder, a horizontal plate fastened to said last named piston whereby said plate can be urged downward by said last named piston and by said smaller cylinder, the dimensions of said last-named plate being smaller than the dimensions of the horizontal section of the cavity of said casing, a hydraulic cylinder on said first mentioned vertically slidable member, a piston acting in the last named cylinder and operatively connected to said rotatable support for rotating said support in said vertically slidable member, a hydraulic cylinder fixed to said rotatable-support, a piston acting in the last named cylinder and operatively connected to said locking means, a hydraulic cylinder fixed on said casing, a piston acting in the last named cylinder and operatively connected to said gates, pipes for feeding a liquid under pressure to each of all the above cylinders, valves on said pipes governing the direction of flow of said liquid therethrough and a plurality of cams connected together for simultaneous rotation and operatively connected, respectively, to the several valves for actuating said valves cyclically.

5. A machine for making foundry molds comprising a frame, a flask consisting of two flask elements and a pattern plate, a member slidably carried by said frame for sliding in a vertical direction, a support rotatably carried by said vertically slidable member and fastened to one of said flask elements, locking means carried by said rotatable support for fastening the other of said flask elements to the first mentioned flask element, a member supported for horizontal sliding movement by said frame provided with a piece interlocking with said pattern plate, supporting means for said pattern plate slidably carried by the frame for vertical movement under said plate, a sand container on the frame having a bottom discharge port, a casing open at top and bottom slidably supported by the frame to slide horizontally under said container, the open top of said casing being immediately under said discharge port, a plate attached to and at the same level as said open top so as to lay immediately under said discharge port when said casing moves away therefrom, gates slidably supported within said casing for closing and opening the passage of sand through said casing, a platform slidably carried by the frame for vertical sliding movement under said first mentioned flask element, hydraulic cylinders on the frame, pistons acting in said clinders and operatively connected respectively to said vertically slidable member, to said horizontally sliding member, to said vertically slidable supporting means and to said vertically slidable platform, a further hydraulic cylinder on the frame above said first mentioned flask element, a piston acting in the last named cylinder and a horizontal plate secured under the last named piston whereby said last-named plate can be urged downward, the dimensions of said last-named plate being smaller than the dimension of the horizontal section of the cavity of said casing, a hydraulic cylinder on said first mentioned vertically slidable member, a piston acting in the last named cylinder and operatively connected to said rotatable support for rotating said support in said vertically slidable member, a hydraulic cylinder fixed to said rotatable support, a piston acting in the last named cylinder and operatively connected to said locking means, a hydraulic cylinder fixed on said casing, a piston acting in the last named cylinder and operatively connected to said gates, pipes for feeding a liquid under pressure to each of all the above cylinders, valves on said pipes governing the direction of flow of said liquid therethrough and a plurality of cams connected together for simultaneous rotation and operatively connected to the several valves, respectively, for actuating said valves cyclically.

6. A machine for making foundry molds comprising a frame, a flask consisting of two flask elements and a pattern plate, a member slidably carried by said frame for sliding in a vertical direction, a support rotatably carried by said vertically slidable member and fastened to one of said flask elements, locking means carried by said rotatable support for fastening the other of said flask elements to the first mentioned flask element, a member supported for horizontal sliding movement by said frame provided with a piece interlocking with said pattern plate, a sand container on the frame having a bottom discharge port, a casing open at top and bottom, slidably supported by the frame to slide horizontally under said container, the open top of said casing being immediately under said discharge port, a plate attached to and at the same level as said open top so as to lay immediately under said discharge port when said casing moves away therefrom, gates slidably supported within said casing for closing and opening the passage of sand through said casing, a platform slidably carried by the frame for vertical sliding movement under said first mentioned flask element, a hollow punch supported by the frame for horizontally sliding movement thereon, whereby said hollow punch can be brought above said first mentioned flask element, hydraulic cylinders on the frame, pistons acting in said cylinders and operatively connected respectively to said vertically slidable member, to said horizontally sliding member, to said vertically slidable platform and to said hollow punch, a further hydraulic cylinder on the frame above said first mentioned flask element, a piston acting in the last named cylinder and a horizontal plate secured under the last named piston whereby said last-named plate can be urged downwards, the dimensions of said last-named plate being smaller than the dimension of the horizontal section of the cavity of said casing, a hydraulic cylinder on said first mentioned vertically slidable member, a piston acting in the last named cylinder and operatively connected to said rotatable support for rotating said support in said vertically slidable member, a hydraulic cylinder fixed to said rotatable support, a piston acting in the last named cylinder and operatively connected to said locking means, a hydraulic cylinder fixed on said casing, a piston acting in the last named cylinder and operatively connected to said gates, pipes for feeding a liquid under pressure to each of all the above cylinders, valves on said pipes governing the direction of flow of said liquid therethrough and a plurality of cams connected together for simultaneous rotation and operatively connected, respectively, to the several valves for actuating said valves cyclically.

7. A machine for making foundry molds, comprising a frame, a flask consisting of two flask elements and a pattern plate, a member slidably carried by said frame for sliding in a vertical direction, a support rotatably carried by said vertically slidable member and fastened to one of said flask elements, locking means carried by said rotatable support for fastening the other of said flask elements to the first mentioned flask element, a member supported for horizontal sliding movement by said frame provided with a piece interlocking with said pattern plate, a sand container on the frame having a bottom discharge port, a casing open at top and bottom, slidably supported by the frame to slide horizontally under said container, the open top of said casing being immediately under said discharge port, a plate attached to and at the same level as said open top so as to lay immediately under said discharge port when said casing moves away therefrom, gates slidably supported within said casing for closing and opening the passage of sand through said casing, a platform slidably carried by the frame for vertical sliding movement under said first mentioned flask element, a hollow punch supported by the frame for horizontally sliding movement thereon, whereby said hollow punch can be brought above said first mentioned flask element, a platform slidably carried by said last mentioned vertically slidable platform for horizontally sliding movement thereon, and on a slide support attached to the frame, a piece slidably carried by the frame for horizontally sliding movement at the same level as said slide support, the height of said piece being equal to the height of said horizontally sliding platform plus the height of the first mentioned flask element, said piece being connected to said horizontally sliding platform for horizontal movement therewith, hydraulic cylinders on the frame, pistons acting in said cylinders and operatively connected respectively to said vertically slidable member, to said horizontally sliding member, to said vertically slidable platform, to said hollow punch and to said horizontally slidable piece, a further hydraulic cylinder on the frame above said first mentioned flask element, a piston acting in the last named cylinder and a horizontal plate secured under the last named piston whereby said last-named plate can be urged downward, the dimensions of said last-named plate being smaller than the dimension of the horizontal section of the cavity of said casing, a hydraulic cylinder on said first mentioned vertically slidable member, a piston acting in the last named cylinder and operatively connected to said rotatable support for rotating said rotatable support in said vertically slidable member, a hydraulic cylinder fixed to said rotatable support, a piston acting in the last named cylinder and operatively connected to said locking means, a hydraulic cylinder fixed on said casing, a piston acting in the last named cylinder and operatively connected to said gates, pipes for feeding a liquid under pressure to each of all the above cylinders, valves on said pipes governing the direction of flow of said liquid therethrough and a plurality of cams connected together for simultaneous rotation and operatively connected, respectively, to the several valves for actuating said valves cyclically.

8. A machine for making foundry molds comprising a frame, a flask consisting of two flask elements and a pattern plate, a member slidably carried by said frame for sliding in a vertical direction, a support rotatably carried by said vertically slidable member and fastened to one of said flask elements, locking means carried by said rotatable support for fastening the other of said flask elements to the first mentioned flask element, a member supported for horizontal sliding movement by said frame provided with a piece interlocking with said pattern plate, a sand container on the frame having a bottom discharge port, a casing open at top and bottom, slidably supported by the frame to slide horizontally under said container, the open top of said casing being immediately under said discharge port, a plate attached to and at the same level as said open top so as to lay immediately under said discharge port, when said casing moves away therefrom, gates slidably supported within said casing for closing and opening the passage of sand through said casing, a platform slidably carried by the frame for vertical sliding movement under said first mentioned flask element, a hollow punch supported by the frame for horizontally sliding movement thereon, whereby said hollow punch can be brought above said first mentioned flask element, a platform slidably carried by said last mentioned vertically slidably platform for horizontally sliding movement thereon, and on a slide support attached to the frame, a piece slidably carried by the frame for horizontally sliding movement at the same level as said slide support, the height of said piece being equal to the height of said horizontally sliding platform plus the height of the first mentioned flask element, said piece being connected to said horizontally sliding platform for horizontal movement therewith, a substantially vertical plate slidingly carried by said horizontally slidable piece for horizontal movement above the upper surface of said horizontally sliding platform, hydraulic cylinders on the frame, pistons acting in said cylinders and operatively connected respectively to said vertically slidable member, to said vertically slidable supporting means, to said vertically slidable platform, to said hollow punch and to said horizontally slidable piece, a further hydraulic cylinder on the frame above said first mentioned flask element, a piston acting in the last named cylinder and a horizontal plate secured under the last named piston whereby said last-named plate can be urged downward, the dimensions of said last-named plate being smaller than the dimension of the horizontal section of the cavity of said casing, a hydraulic cylinder on said first mentioned vertically slidable member, a piston acting in the last named cylinder and operatively connected to said rotatable support for rotating said support in said vertically slidable member, a hydraulic cylinder fixed to said rotatable support, a piston acting in the last named cylinder and operatively connected to said locking means, a hydraulic cylinder fixed on said casing, a piston acting in the last named cylinder and operatively connected to said gates, a hydraulic cylinder on said horizontally slidable piece, a piston acting in the last named cylinder and operatively connected to said substantially vertical plate, pipes for feeding a liquid under pressure to each of the above cylinders, valves on said pipes, governing the direction of flow of said liquid therethrough and a plurality of cams connected together for simultaneous rotation and operatively connected, respectively, to the several valves for actuating said valves cyclically.

CASTO ENNIO BERGAMI.

References Cited in the file of this patent

UNITED STATES PATENTS

| Number | Name | Date |
|---|---|---|
| 2,012,478 | Oyster | Aug. 27, 1935 |
| 2,542,243 | Gedris | Feb. 20, 1951 |
| 2,559,647 | Legere | July 10, 1951 |